Nov. 4, 1941.　　　L. M. CHRISTENSEN　　　2,261,224
APPARATUS FOR THE RECOVERY OF UNFERMENTABLE RESIDUES
Original Filed July 26, 1938
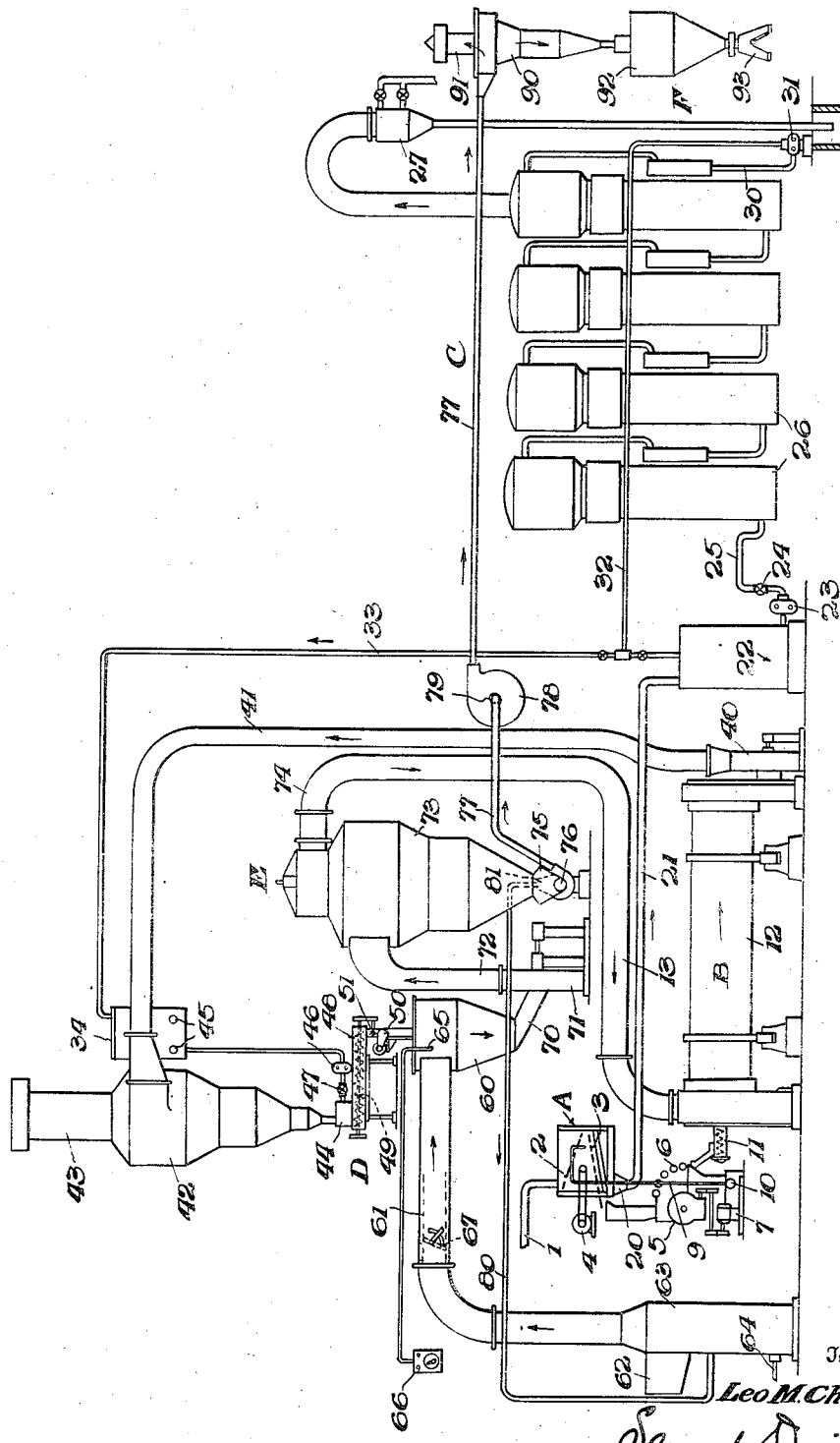
Inventor.
Leo M. Christensen
Seward Davis Attorney Patented Nov. 4, 1941

2,261,224

UNITED STATES PATENT OFFICE 2,261,224

APPARATUS FOR THE RECOVERY OF UNFERMENTABLE RESIDUES

Leo M. Christensen, Atchison, Kans., assignor to The Chemical Foundation, Incorporated, a corporation of Delaware Original application July 26, 1938, Serial No. 221,453. Divided and this application October 28, 1938, Serial No. 237,559

10 Claims. (Cl. 99—235)

This invention relates to an improved apparatus for treating distillers' slop.

The present application is a division of prior application Serial No. 221,453, filed July 26, 1938.

As is known distillers' slop is a by-product derived from the distillation of alcohol produced from the saccharification and fermentation of grains. The unfermentable residues, which are collected as an aqueous residuum in the base of a beer still, contain substantially all the crude fiber, minerals, oil and proteins of the original grain and, in addition, a considerable quantity of yeast proteins produced during the fermentation process. From the standpoint of dietetic value in a feed, these constituents are the most valuable part of the grain.

The amount of these residues is considerable. For example when a bushel of corn is treated to produce alcohol, there remains from substantially 16 to 18 pounds of unfermented residues, which amount constitutes from substantially 25 to 30 percent (dry basis) of the original grain. Since this product finds a ready market many methods of recovering a dry feed from the highly dilute slop have been proposed.

The recovery of these distillers' grains in such a manner as to retain the full dietetic value of the constituents presents many problems. The crude beer slop contains on the average about 7% of total solids, about one-half of which are in the form of relatively large suspended particles, and the other half in the form of very fine and highly dispersed suspensoids and colloids, and some soluble constituents. The recovery of these valuable constituents necessitates the handling and separation of very large quantities of water.

It has been proposed in the past to treat distillers' slop by passing the slop in hot condition over screens so as to separate out the larger and readily filterable particles. The separated wet solids were then further dewatered, as in a press, and were treated in a rotary steam or direct fire heated drier. The filtrate or thin slop from the first screening operation was treated in various manners, such for example as in a multiple effect evaporator, so as to concentrate the solution to a syrup. It has been proposed in the past to produce a separate feed from this syrup and also to add the syrup to the larger filtered grains passing to the rotary drier.

The treatment of the finer protein material, that is to say, that occurring in the so-called "soluble" form, in the past has been attended with considerable difficulty. This material is of a colloidal nature and tends to form syrupy or gelatinous systems of high viscosity when in fairly highly concentrated form. Thus in the past when it has been attempted to dry such syrup down in a rotary drier, the material tends to stick to the sides of the drum. Furthermore, in the past it has been extremely difficult homogeneously to incorporate the concentrated protein syrup in the preliminarily separated solids. Such syrup, as noted above, is a liquid of relatively low fluidity and thus tends to coat the surfaces of the larger particles separated out on the screen. In these circumstances the protein syrup penetrates the larger particles to only a minor degree and uniform drying of the mixed product is therefore extremely difficult.

It has now been found that the valuable nutritious constituents of the original raw material may be substantially quantitatively recovered and in the form of a novel and improved product. A characteristic feature of the invention is the fact that the larger particles of the distillers' slop are first separated out from the slop, as by screening, are then dried down to a certain definite optimum moisture content, and are subsequently contacted with a protein solution of selected optimum concentration under such circumstances that the concentrated solution readily penetrates the preliminarily dried particles, so as homogeneously to be distributed therethrough. This mixed product is then subjected to a special type of flash drying whereby the product is dried down to the desirable extent and under such controlled conditions of temperature and time that caramelization and/or decomposition of the protein constituents is avoided. As will be seen more fully hereinafter, the major advantages of the invention may be attained by subjecting the larger solid particles or aggregation of the slop to a preliminary drying under controlled conditions of temperature such that this material is rendered absorptive to the relatively viscous concentrated protein syrup. This first step may therefore be regarded as a special treatment for improving the penetrability of the solids and in which there is achieved the concomitant advantage of reduction of moisture content. In the second major stage of the process the solids, of high penetrability, are impregnated or saturated with a protein syrup of optimum concentration under such circumstances that the solution is absorbed directly in the fibers, rather than being deposited on the surfaces of the fibers as a coating. The saturated solid particles are then amenable to a special type of flash drying whereby the moisture content is reduced to the desired extent and in the minimum time. In these circumstances, as will appear more fully, the thoroughly saturated particles are extenuated or dispersed through the hot gas phase and the individual particles are quickly and uniformly dried down in a minimum time, thus avoiding prolonged contact with high temperature gases and corresponding thermal decomposition.

It will be appreciated that this type of treatment insures the production of a product of improved physical characteristics. The feed, produced under this method of homogeneous impregnation of the fibers by the concentrated protein solution, followed by the special flash drying, is of a characteristic light brown color which sharply distinguishes it from the darker products produced by complete drying in rotary driers. The new product similarly is of a light fluffy nature, the individual particles of which are crisp and frangible. This physical state is due in part to the fact that the finer protein solids, originally contained in the thin slop, instead of being present on the surface as a type of mucilaginous coating, are distributed through the interstices of the fibrous particles themselves, and in part to the fact that, in sharp contradistinction to older methods, the impregnated solids are not tumbled or nodulated in a rotary element like the rotary drier.

It will be observed that the present method invokes several advantageously correlated concepts, the utilization of which insures a particularly effective drying with the production of an improved product. These broader concepts include the preliminarily controlled drying of the screened solids, i. e. the accurate reduction of the moisture content of these solids, not so much for the purpose of drying, per se, as for the major purpose of conditioning these solids for the subsequent optimum impregnation by the thin slop concentrate or protein syrup. The screened solids, when thus specially preconditioned, are then not merely wetted by the syrup, but are actually impregnated or saturated with the syrup. To insure such optimum impregnation, as will appear more fully, the conditions of syrup concentration are carefully controlled such that the syrup produced in the new method is of optimum penetrability with respect to the preconditioned screened solids. It might well be observed at this point that, in the present process, the concentration of the syrup is not carried out to the maximum extent, i. e., to secure a very high protein concentration, but is controlled short of this point for the purposes stated. The saturated, preconditioned screenings are then extenuated or highly dispersed in a gaseous medium and are flash dried with hot gases. After such flash drying, or rapid removal of moisture from all surfaces of the particles, the temperature of the product is rapidly reduced to avoid charring and proteolytic decomposition.

As a result of considerable experimentation, it has been found that the described process can best be effectuated in an improved apparatus in which the several elements are advantageously correlated to insure the best results with the process.

A major object of the invention therefore is to provide an improved apparatus for producing distillers' dried grains from beer slops and equivalent material.

Another object is to devise an apparatus for producing distillers' dried grains in which the material undergoing treatment is submitted to specially correlated sequential drying treatments.

A further object is to provide an apparatus for producing distillers' dried grains which is so designed as to eliminate fire hazards.

Yet another object is to provide an apparatus of the type described in which a large thruput of material may be accommodated with a minimum of structural elements.

With these and other equally important and related objects in view the invention comprehends the concept of providing an apparatus in which the material undergoing treatment may be treated continuously in a simplified two stage drying system to produce a product of improved characteristics. To more completely explain the invention, a preferred form of apparatus is shown in the single figure of the accompanying drawing, it being understood that this structure there shown is given as illustrative, and not as the exclusive means available for employment under the invention.

In the single figure of the accompanying drawing is indicated, diagrammatically, a preferred arrangement of units which has been found to be effective. While not shown, it is to be understood that this apparatus is associated with a still house, the slop from the beer still of which is to be treated according to the invention.

The major stages of the process comprise a screening stage, indicated generally by the letter A, in which the crude slop, containing on the average about 7% of solids, is filtered or screened to separate the wet solids from the thin filtrate or slop; a preconditioning-drying stage, indicated generally by the letter B, in which the screenings from stage A, and which contain about 70% of moisture, are dried down to a definite moisture content; a concentration stage C, indicated on the drawing as a quadruple effect evaporator in which the filtrate or thin slop is concentrated down to a definite concentration of solids; and impregnating stage D, indicated on the drawing as a mingler, in which the preconditioned screened solids are impregnated with the concentrated protein solution; a drying stage E, in which the impregnated preconditioned solids are dried down under definite conditions of temperature control so as to produce a light, flocculent, dried feed; and a final stage, F, indicated as a hopper structure in which the dried solids are weighed and bagged.

Each of these stages may be modified considerably as to structure and design, while fulfilling the major functions demanded according to the present invention.

Considering the apparatus and the flow of material in more detail, the beer slop is withdrawn from the beer still or from a storage receptacle by a pump (not shown) and is conveyed through line 1 to the dry house unit. The beer slops are discharged from line 1 into the screening stage stage A. Preferably this comprises an upper fixed screen 2 and a lower vibrating screen 3, the latter screen being vibrated by any suitable source of power, such as the motor 4. Screens 2 and 3 are mounted with a differential pitch or angularity so as to accelerate the speed of flow of the materials through the screening unit and to insure optimum filtration of the solid particles from the solution.

The solid portions of the slops, separated out by the screens 2 and 3, are passed continuously to the press 5. This press may be of any suitable type of construction and is illustrated as a series of press rolls 6, driven through any suitable transmission mechanism by the motor 7. In this device the screenings discharged from screens 2 and 3 are subjected to mechanical pressure to express additional amounts of solution therefrom. The liquid which is expressed from the screenings accumulates in a suitable container in the lower section of press 5 and is recycled through pump 8 and line 9 to either screen 2 or 3.

The pressed wet grain is discharged through the trough 10 and conveyor 11 to the drying-preconditioning stage B. This stage preferably comprises a suitable rotary drier 12, into one end of which is simultaneously fed the screenings from the press 6 and hot exhaust gases from the flash drying unit through the conduit 13.

The filtrate obtained from the material passing over the screens 2 and 3 is accumulated in the trough 20 and is passed thence either under a gravity head or pump pressure through the line 21 to the thin slop storage tank 22. From this tank the slop is picked up by pump 23 and passed, in amounts controlled by valve 24, through the line 25 to a suitable concentration stage and preferably to the quadruple effect evaporator 26 as shown. The steam lines and other connections of the quadruple effect evaporator, for the sake of simplicity, have been omitted but it being understood that any suitable type of multiple effect evaporator may be employed for this stage. Connected to the last effect is the barometric condenser unit 27 which, similarly, may be of any suitable construction and preferably, as shown, comprises a multiple jet barometric condenser. The concentrated slop or syrup is withdrawn from the last effect through the line 30 and is forced by pump 31 through the lines 32 and 33 to the syrup tank 34, from whence it may be passed, in a manner to be described, to an impregnation stage in which it is utilized to thoroughly saturate the preconditioned screened solids.

Where circumstances so require, as for example when the unit is shut down, syrup accumulating in the last effect may be by-passed through line 33' to the storage tank 22.

The solid material separated out by the screens and which has been preconditioned in the stage B is picked up by the exhaust fan 40 and is forced upwardly through the line 41 to the rotary drier cyclone 42. This cyclone is provided with the flue gas exhaust vent 43 which may discharge to the atmosphere or may be connected to any suitable absorption unit for the recovery of valuable components of the flue gases.

The hot, partially dried screenings pass downwardly through the cyclone 42 to the hopper 44, where they are sprayed or otherwise intimately contacted with the protein syrup or concentrate. To facilitate impregnation of the screenings by the syrup, such syrup is preferably heated to an elevated temperature by means of steam coil 45 and is forced, under pressure, by means of the pump 46, into the hopper 44. The flow of the syrup may be controlled by means of regulating valve 47. While, as indicated, it is preferred to heat the syrup and force it under positive pressure, it is clearly to be understood that the heating means 45 may be dispensed with and gravity flow of the syrup utilized.

After being wetted by the syrup, the solids are tumbled in the mingler 48. This mingler is provided with the screw conveyor 49 which serves to convey the material from the hopper to the flash drier. While the screenings are moved through the mingler, they are continuously agitated to insure complete wetting of the screened particles by the solution and are insured an adequate length of time or travel so as to permit thorough impregnation by the syrup. The impregnated screenings are then discharged from the mingler to a rotary feeding mechanism 50 in which the screenings are dispersed or broken up to prevent agglomeration and clogging of the unit. It has been found advisable to insert an air damper 51, opened to a sufficient degree, in the line between the rotary feeder and the flash drier. In these circumstances, due to the flow of gases through the unit, a flow of air through the damper 51 is induced into the feed line which serves most effectively to prevent clogging of the line.

In accordance with a major concept of the invention, as explained hereinbefore, the preconditioned and syrup-impregnated screenings are then discharged into the flash drying stage E, that is to say, into an enlarged confined area in which, while in dispersed or unagglomerated condition, the screenings are contacted with high temperature gases moving at relatively high velocity. In these circumstances the individual particles are conveyed through a zone in which they are contacted, over their entire area, by hot gases. As a result of such hot gas drying while the particles are in dispersed or extenuated condition, the moisture content is rapidly abstracted. As shown, the screenings are discharged from the rotary feeder into the flash drier 60, to which drier is fed a gaseous drying medium from the inlet line 61.

Preferably the drying medium is comprised of hot flue gases. Where the furnace section of the plant is operated with gas as the fuel, such flue gases may be withdrawn directly from the furnace itself. In other circumstances, or in any circumstance if so desired, such flue gases may be withdrawn from the main furnace of the plant and passed through a filter (not shown) and then through the inlet 62 to the flue gas heater 63. This heater may be provided with suitable heating means, such as the gas burners 64. The flash drier, it will be noted, is provided with the pyrometer 65, which is connected to the temperature controller-recorder 66. This instrument may be associated with the gas burners 64 or with an air damper 67 in a manner known to those skilled in the art, so as accurately to control the temperature of the gases entering the drier at any desired value.

The flue gases, as shown, enter the flash drier 60 at the upper section thereof and preferably tangentially. The impregnated screenings passing down the central zone of the drier are thus dispersed and given cyclonic motion. The hot flue gases with the dispersed solids then pass through the flash dried discharge 70 and are picked up by the flash drier fan 71, driven by any suitable mechanism. The gases with their suspended solids are thus forced upwardly through the line 72 and are injected tangentially into the upper portion of the flash drier cyclone 73. In the enlarged flash drier cyclone the large solids gravitate towards the bottom and the gases are withdrawn from the upper section of the cyclone and are passed through line 74 to the predrying stage B, that is to say, to the inlet of the rotary drier 12.

It is to be noted at this point that certain special precautions must be observed in the construction of the flash drier. As a result of considerable experimentation it has been found that, in the flash drying of combustible material such as the screenings here treated, it is important that the discharge elbow 70 be as free as possible from angular joints. It has been found as a matter of actual experience that a typical elbow joint, i. e., one made up of a series of angularly disposed pipe sections, is a distinct fire hazard. With such an angular construction it appears that the hot solids tend to accumulate in the angles and, after an appreciable mass has accumulated, it spontaneously ignites. This difficulty is completely avoided by adopting the construction shown, that is, to connect the flash drier to the intake of fan 71 through the medium of a substantially straight pipe section 70 which is set at an angle which is less than the critical angle of repose of the solids.

As will particularly be observed, the bottom of the cyclone 73 is somewhat enlarged as at 75. Connected to this section of the cyclone is the blower 76 which is provided with an air inlet line 77. During operation this blower picks up the dried solids accumulating in the bottom of the cyclone, immediately and intimately mixes these with cooler air, admitted through the air intake 76, and forces them through the discharge line 77 toward the bagging stage F. As will be seen more fully hereinafter, these dried solids reach the bottom of the cyclone at a quite elevated temperature and, in order to prevent too drastic drying or charring, not to say actual combustion, it is necessary that such solids be quickly cooled well below the temperature attained in the drier. This quick or flash cooling is effected to a considerable degree by the blower 75 in that, in the manner explained, it induces a rapid flow of cooler air and intimately mixes this with the solids. To positively insure against thermal decomposition of the product, the supply of air to the air inlet 76 may be refrigerated or, as shown, a supplemental blower 78, having the air inlet 79, may be interposed in the discharge line 77. Preferably this is disposed in rather close proximity to the blower 75 so as to insure a steep temperature gradient for the solids. Blower 78 thus serves as, so to speak, a booster blower and functions rapidly to force the dried solids to the bagging equipment and also serves as a supplemental cooling means to positively insure a rapid abstraction and dissipation of heat from the solids.

As intimated hereinbefore, the flash drying of distillers' spent grains must be carried out under special conditions in order to insure against charring and combustion. It has been found, in actual operations, that in some instances, even when blower 75 was operating, that combustion of the solids occurred. It was determined that this was due to the retention of the hot gases in the base of the cyclone which overheated the solids before they could be withdrawn. Since these solids have an appreciable specific heat, contact with hot gases for any appreciable length of time would tend to cause combustion. After considerable experimentation it was discovered that such a contingency could positively be avoided by withdrawing a portion of the gases from the lower area of the cyclone and preferably from a point relatively closely adjacent the solids discharge duct. The amount so withdrawn need not be great and, in any event, considerably less than the quantity discharged through the line 74. The withdrawal of a modicum of these hot gases from the zone where the hot solids tend to accumulate appears to reduce the temperature below the critical or danger point.

Such a beneficial result may be secured by the method shown on the drawing. As there shown a discharge pipe 80 is in communication with the interior of the cyclone 73 and near its lower end. Such pipe terminates in an inverted cone 81 which, at the one time, provides a deflecting baffle over which the descending solids pass, and a bell mouth intake for the hot gases. The other end of the line 80 may be connected to a suitable source of suction so as to insure a positive flow of gases from the base of the cyclone. In order to conserve the heat of these gases and thereby insure thermal economies in the operation, the discharge end of the duct 80 preferably is connected to the flue gas heater in the manner shown. In these circumstances the aspirating effect of the gases passing up through the heater 63 induces a flow of hot exhaust gases through the line 80 and thus, to a commensurate extent, cools down the solids. With this type of structure, it has been found that the fire hazard hereinbefore mentioned is completely avoided.

As explained in copending application Serial No. 221,453, the process must carefully be controlled to insure the best results. The operation effected in stage B is for the purpose of increasing the peneterability and absorption of the syrup or concentrate from stage C. If the solids from stage B are too wet or moist they will absorb an insufficient amount of the concentrated syrup, due to the fact that they are already near the point of liquid saturation, on the other hand; if the solids are too dry the syrup does not actually penetrate such solids but tends to form a coating on the surface. It has been found, as explained in the prior application that the best results are secured when the solids passing from stage B have a moisture content of between 15% to 25% and the syrup from stage C have a concentration of from approximately 20 to 25% solids. In these circumstances optimum absorption of syrup and optimum homogeneity in the final product is insured. This moisture content of the screenings, on the one hand and the solids content of the concentrate, on the other, may be established in any suitable manner. In the particular apparatus chosen for illustration the described characteristics in the screenings and concentrate respectively may be insured by controlling the temperature of the gas and the time of passage of the screenings through the different stages in the manner more particularly described hereinafter.

With such a controlled preconditioning treatment of the spent grains and the described regulated concentration of the thin slop, coupled with a flash drying and flash cooling of impregnated grains, a novel improved product is produced. Such a product contains from substantially 28% to 35%, or more, of protein material of which substantially 90% is available. The new product is of a very light brown color and of a characteristic light and fluffy texture as compared to the older types of products which are of a darker brown color and of a more gummy texture.

In the operation of the improved method, in the type of apparatus illustrated, the beer still residues are continuously pumped through line 1 and discharged into the screening section A. The screened and pressed grains, which at this point contain about 70% of moisture, are passed to the rotary drier 12 at the entrance of which they are intimately contacted with hot flash drier exhaust gases entering the drier 12, which are about half saturated with moisture, and preferably are maintained at a temperature of approximately 375° F. The spent grains and hot gases pass together through the rotary and are picked up by the fan 40. The speed of flow or retention period in the rotary 12 may be controlled by the fan 40 so that the gases leave the drier at a temperature of approximately 250° F. In the illustrative structure in which the drier 12 is approximately 26 feet long and 6 feet in diameter, this is accomplished by operating the fan 40 at an approximate speed of 1,000 R. P. M. The hot spent grains are then forced upwardly through the line 41 to the cyclone 42. Under these conditions of operation the spent grains are discharged to the hopper 44 with a moisture content within the optimum range, that is to say, between about 15% and 25% of moisture.

In the hopper 44, or its equivalent, the preconditioned spent grains are contacted with a spray of hot protein syrup of a concentration of between substantially 20% and 25% of solids. The quantity of the concentrate sprayed upon and mingled with the preconditioned grains is so controlled as to increase the moisture content of the preconditioned grains back to approximately 75% in which condition they are then discharged to the flash drier. It will be appreciated at this point that the moisture content of the spent grains entering the flash drier 65 is substantially the same as that entering the preconditioning stage B with the notable exception that the spent grains entering the drier 65 are saturated with a protein syrup of high concentration.

In the drier 65, in the manner describd, the saturated and impregnated spent grains are contacted with a high velocity stream of hot gases. In the present operation, as explained, the temperatures of the gases entering the drier are carefully controlled. It has been found as a result of considerable experimentation that the temperature of inlet gases should not exceed 500° F. and preferably should be maintained at about 475° F. The spent grains passing downwardly through the flash drier 65 are therefore contacted for a brief period with a high velocity stream of hot gases. The gaseous suspension of the solids is then picked up by the fan 71 and forced to the cyclone 73. In ordinary circumstances it will be found that the temperature of the mass passing through the duct 72 is of the order of 375° C. The velocity of the mass through the flash drier should preferably be controlled such that the temperature in the discharge duct 72 should not exceed 425° F. The fluid suspension then passes to the enlarged cyclone 73 in which the velocity is diminished and in which, due to the continual contact with the hot gases, additional amounts of moisture are evaporated from the solids. The dried solids are then picked up by fan 76, are intimately intermixed with cooler air drawn in through inlet 73 and are discharged through duct 77. Booster blower 78 picks up the product, cools it further, and forces it through the discharge line 77 to the cyclone 90, from the upper vent 91 of which hot gases are exhausted to atmosphere. The dried solids, which at this point are at a temperature of about 100° F. and a moisture content of from approximately 6 to 12%, pass down to cyclone 90 and are discharged to the receiving hopper 92, or to any other convenient storage. From the hopper 92 the material may be directly discharged through the weighing mechanism 93 into bags or other receptacles for shipment.

The hot gases which separate from the dried solids in cyclone 73 pass outwardly through line 74 to the gas inlet 13 which is connected to the intake of the drier. As noted above, the temperature of the gases passing through this line is maintained at approximately 375° F. In order to accentuate the cooling of the solids in the lower portion of the cyclone, a fraction of the hot gases is continuously withdrawn through line 80 and are recycled through the gas circuit.

In the type of operation described, and in a plant capable of handling the slops from a 10,000 gallon alcohol unit, approximately 30 tons per day of dried feed may be obtained. The stated desirable moisture content of the preconditioned solids and the finally dried solids may be secured by controlling the temperature in the several sections of the circuit at the approximate values mentioned and by passing the solids through the flash drier and the flash drier cyclone for a period of contact of from about 20 to 30 seconds with a gaseous medium maintained at a temperature of the order of 475° F. and then very quickly reducing the temperature of the solids down to the order of 100° F. In these circumstances, the beer slops, containing about 7% total solids, are converted to a light, dried feed containing from approximately 6 to 12% of moisture of which feed analyzes from approximately 28% to 35%, or more, of proteins.

This material constitutes an excellent food of high dietetic value. It will be understood that this particular product, in view of the intimate or homogeneous distribution of the protein content, constitutes an excellent starting material for the production of protein plastics in that it not only contains a high percentage of reactive protein but also contains an excellent ultimate filler, namely, the cellulosic hull fibers of the original grains.

While a preferred apparatus has been described herein, it is to be understood that this is given as illustrative of the underlying principles of the invention, and not as the exclusive means by which the invention may be effectuated. Various modifications in the arrangement of the units and in the particular elements may be made within the spirit of the invention as defined in the appended claims.

I claim:

1. An apparatus for producing feed from distillery slop, comprising, in combination, a screening device for dewatering the slop, a rotary drier, means to feed dewatered slop to the said drier; a flash drier, means to feed material from the rotary drier to the flash drier; a source of flue gases and means to feed flue gases sequentially through the flash drier and rotary drier.

2. An apparatus for producing feed from distillery slop, comprising in combination, mechanical means to partially dewater the slop, a rotary drier, means to feed the dewatered slop to the said drier; a flash drier, means to feed material from the rotary drier to the flash drier; a source of flue gases, and means to feed the flue gases sequentially through the flash drier and rotary drier.

3. An apparatus for producing feed from distillery slop, comprising, in combination, mechanical means to partially dewater the slop; a rotary drier, means to feed the dewatered slop to the said drier; a flash drier, means to feed material from the rotary drier to the flash drier; a source of flue gases, and means to feed the flue gases sequentially through the flash drier and rotary drier in a direction concurrent with the flow of dewatered slop.

4. On apparatus for producing feed from distillery slop which comprises, in combination, screening means to partially dewater the slop; a rotary drier, means to feed screenings to the said drier; a flash drier, means to feed material from the rotary drier to the flash drier, means to concentrate the filtrate from the screenings, means to add the concentrated filtrate to the material undergoing drying at a point intermediate the rotary drier and the flash drier; a source of flue gases, and means to feed the flue gases sequentially through the flash drier and rotary drier.

5. An apparatus for producing feed from distillery slop which comprises, in combination, screening means to partially dewater the slop; a rotary drier, means to feed screenings to the said drier; a flash drier, means to feed material from the rotary drier to the flash drier, means to concentrate the filtrate from the screenings, means to add the concentrated filtrate to the material undergoing drying at a point intermediate the rotary drier and the flash drier; a source of flue gases, and means to feed the flue gases sequentially through the flash drier and rotary drier in a direction concurrent with the material undergoing drying.

6. An apparatus for producing feed from distillery slop which comprises, in combination, means to partially dewater the slop; a rotary drier, means to feed dewatered slop to the rotary drier; a blower connected to the discharge end of the rotary drier; a flash drier, a conduit connecting the blower with the flash drier; a source of flue gases, a conduit therefor serially connected with the flash drier and the rotary drier whereby flue gases are forced sequentially through the flash drier and rotary drier.

7. An apparatus for producing feed from distillery slop which comprises, in combination, means to partially dewater the slop; a rotary drier, means to feed dewatered slop to the rotary drier; a blower connected to the discharge end of the rotary drier; a flash drier, a conduit connecting the blower with the flash drier; a source of flue gases, a conduit therefor serially connected with the flash drier and the rotary drier whereby flue gases are forced sequentially through the flash drier and rotary drier in a direction concurrent with the flow of material undergoing drying.

8. An apparatus for producing dry feed from distillery slop which comprises, in combination, dewatering means for the slop, a rotary drier adapted to receive the dewatered slop, a flash drier connected to the discharge end of the rotary drier and adapted to receive material discharged from the rotary drier and means to pass hot gases sequentially through the flash drier and rotary drier.

9. An apparatus for producing dry feed from distillery slop which comprises, in combination, dewatering means for the slop, a rotary drier adapted to receive the dewatered slop, a rotary drier cyclone connected with the discharge end of the rotary drier, a flash drier; a flash drier cyclone conduit means for serially connecting together the rotary drier, the rotary drier cyclone, the flash drier and flash drier cyclone; and means to pass hot gases successively through the flash drier, flash drier cyclone, rotary drier and rotary drier cyclone.

10. An apparatus for producing dry feed from distillery slop which comprises, in combination, means to separate the distillery slop into a thin slop and heavy slop; a rotary drier and rotary drier cyclone, means to feed the heavy slop through the said drier and cyclone; a multiple effect evaporator, means to feed the thin slop to the evaporator for concentration therein; means to withdraw the concentrate from the evaporator and mingle it with material discharged from the rotary drier cyclone; a flash drier and serially connected flash drier cyclone, means to feed the mingled material through the flash drier and cyclone, means to withdraw dried material from the flash drier cyclone; and means to force hot gases serially through the flash drier, flash drier cyclone and rotary drier to dry the products passing therethrough.

LEO M. CHRISTENSEN.